United States Patent [19]

Marshall et al.

[11] Patent Number: 5,530,421
[45] Date of Patent: Jun. 25, 1996

[54] CIRCUIT FOR AUTOMATED CONTROL OF ON-BOARD CLOSED CIRCUIT TELEVISION SYSTEM HAVING SIDE AND REAR VIEW CAMERAS

[75] Inventors: Brian P. Marshall; Anthony J. Kraft, both of Fort Wayne, Ind.

[73] Assignee: Navistar International Transportation Corp., Chicago, Ill.

[21] Appl. No.: 233,867

[22] Filed: Apr. 26, 1994

[51] Int. Cl.$^6$ .................................................. B60Q 1/00
[52] U.S. Cl. ......................... 340/436; 340/435; 348/149
[58] Field of Search ...................... 340/436, 435, 340/460, 461, 463; 348/118, 148, 149

[56] References Cited

U.S. PATENT DOCUMENTS

| 4,910,591 | 3/1990 | Petrossian et al. | 348/148 |
| 4,949,186 | 8/1990 | Peterson | 348/149 |
| 5,027,200 | 6/1991 | Petrossian | 348/149 |
| 5,289,321 | 2/1994 | Secor | 348/149 |

FOREIGN PATENT DOCUMENTS

| 2465612 | 4/1981 | France . |
| 0266986 | 11/1928 | Japan . |
| 0008729 | 1/1981 | Japan . |
| 0209635 | 12/1983 | Japan . |
| 0123587 | 5/1989 | Japan . |
| 0164637 | 6/1989 | Japan . |
| 0189289 | 7/1989 | Japan . |
| 115580 | 6/1969 | United Kingdom . |

OTHER PUBLICATIONS

"Clarion CJ–711F, CJ–720F Car Rearview TV Monitor" Installation Instructions, Clarion Co. Ltd.
"Clarion CC–810 Camera/Model: CJ–710 Monitor" Installation Guide No. 284–4981–01 Clarion Co. Ltd.
"Clarion CJ–711F, CJ–720F Car Rearview TV Monitor" Owner's Guide.

*Primary Examiner*—Brent A. Swarthout
*Assistant Examiner*—Nina Tong
*Attorney, Agent, or Firm*—Dennis K. Sullivan

[57] ABSTRACT

An automotive vehicle, such as a tractor-trailer, has a closed circuit television system that provides the driver with rear and side views of blind spots that the he or she may otherwise be unable to see. When the vehicle is placed in reverse, the view from the rear camera is forced onto the screen of the video monitor to the exclusion of the side camera, or any other camera connected to the system. The invention provides an automation circuit that is responsive to turn signal and hazard warning signal actuation for causing the side camera to be actively connected to the monitor screen when the turn signal system is actuated to give a turn signal to the same side as that viewed by the side video camera and for preventing the side camera from being actively connected to the monitor screen when the hazard warning system is actuated to give a hazard warning signal.

5 Claims, 1 Drawing Sheet

5,530,421

CIRCUIT FOR AUTOMATED CONTROL OF ON-BOARD CLOSED CIRCUIT TELEVISION SYSTEM HAVING SIDE AND REAR VIEW CAMERAS

FIELD OF THE INVENTION

This invention relates to automotive vehicles that are equipped with closed circuit television systems that enable the driver to view blinds spots that he or she otherwise may be unable to see when operating the vehicle, particularly side and rear views.

BACKGROUND AND SUMMARY OF THE INVENTION

An example of a vehicle that may advantageously use such a closed circuit television system is a tractor-trailer in which the driver sits inside the tractor cab to one side of the vehicle, commonly to the left side. In the absence of the vehicle being equipped with such a closed circuit television system, the driver will typically not enjoy a full field of view either directly to the rear or to the opposite side from where he or she is seated (i.e., to the right side when the driver's seat is on the left side), even assuming that the vehicle is equipped with the usual mirrors. The obstruction of these views is due largely to the presence of the trailer behind the tractor and to the fact that the driver sits to one side of the cab. Equipping such a tractor-trailer with a closed circuit television system having strategically positioned video cameras can substantially widen the driver's fields of view to the rear of the vehicle and to the opposite side from where he or she is seated.

One presently commercially available closed circuit television system for a tractor-trailer comprises plural video cameras, one of which observes a field of view to the rear and another of which observes a field of view to the opposite side from where the driver is seated. These two cameras are coupled via respective video cables with respective video input ports of a video switch that has a video output port coupled via a video cable with a video input port of a video monitor inside the cab where the monitor's screen can be conveniently viewed by the driver. The monitor comprises certain external controls, one of which is an on-off switch for turning the monitor screen on and off, and another of which is a mode switch for selecting either a manual or an automatic mode of operation. The video switch comprises certain external controls, including a mode switch for selecting either a manual or an automatic mode of operation and port-enabling switches associated with the respective video input ports to which the cameras are respectively coupled for selectively enabling each respective port. In addition to the video switch's connections with the cameras and to the connection of the monitor with the video switch, both the monitor and video switch have connections with the vehicle's D.C. electrical system. These connections are to the vehicle's D.C. power for supplying D.C. power and to the vehicle's back-up light switch for sensing when the vehicle's transmission is placed in reverse. Typically, the commercially available system is installed to allow the driver to select the view from any particular camera, except that when the vehicle transmission is placed in reverse gear, as sensed by actuation of the vehicle's back-up light switch that operates the vehicle's back-up lights, the rear view camera overrides any other camera selected for display so that the rear field of view is thus automatically forced onto the monitor whenever the vehicle is placed in reverse.

One tractor-trailer fleet operator has specified certain additional criteria for further automated operation of such a closed circuit television system that will force, or exclude, certain displays on, or from, the monitor without driver involvement, depending upon not only gear selection, but also upon turn signal and hazard warning signal actuation. The commercially available system described above is incapable of meeting these additional criteria without modification.

The present invention relates to a circuit for accomplishing such further automated operation without modification of the components of the commercially available closed circuit television system described above. Briefly, the invention satisfies the specified criteria in a cost-effective manner by a modification that, in a presently preferred embodiment, involves the addition of only two relays, two diodes, and related wiring connections. In the case of vehicles already in service, the modification can be made by tying into existing wiring harnesses. In the case of new vehicles, the modifications can be built into the vehicle wiring as original equipment at the factory, allowing the closed circuit television system to be installed either at the factory where the vehicle is built, or later by the customer.

The invention enables the following operations to be automatically accomplished. 1) The rear video camera will continue to be actively connected to the monitor to the exclusion of any other video camera whenever the vehicle is placed in reverse gear regardless of whether or not a hazard warning or turn signal is being given. 2) The video camera on the side opposite the driver will be actively connected to the video monitor to the exclusion of any other video camera when the turn signal for that opposite side is being given to signal a turn toward that side, provided that neither reverse gear nor the hazard warning signal is being selected at the same time as that turn signal. 3) The video camera on the side opposite the driver will be prevented from being actively connected to the monitor whenever the hazard warning signal is being given. In this way, the monitor will, for a vehicle where the driver sits on the left side of the cab: 1) be forced to display the rear field of view when the vehicle is backing up; 2) be forced to display the right field of view when the vehicle is making a forward right turn and the hazard warning signal is not being concurrently given; and 3) be incapable of displaying the right field of view whenever a hazard warning signal is being given.

The foregoing, along with further features, advantages, and benefits of the invention, will be seen in the ensuing description and claims which should be considered in conjunction with the drawing that accompanies this disclosure as an exemplary presently preferred embodiment of the invention in accordance with the best mode contemplated for carrying out the invention at this time.

DESCRIPTION OF THE PREFERRED EMBODIMENT

Figure 1:
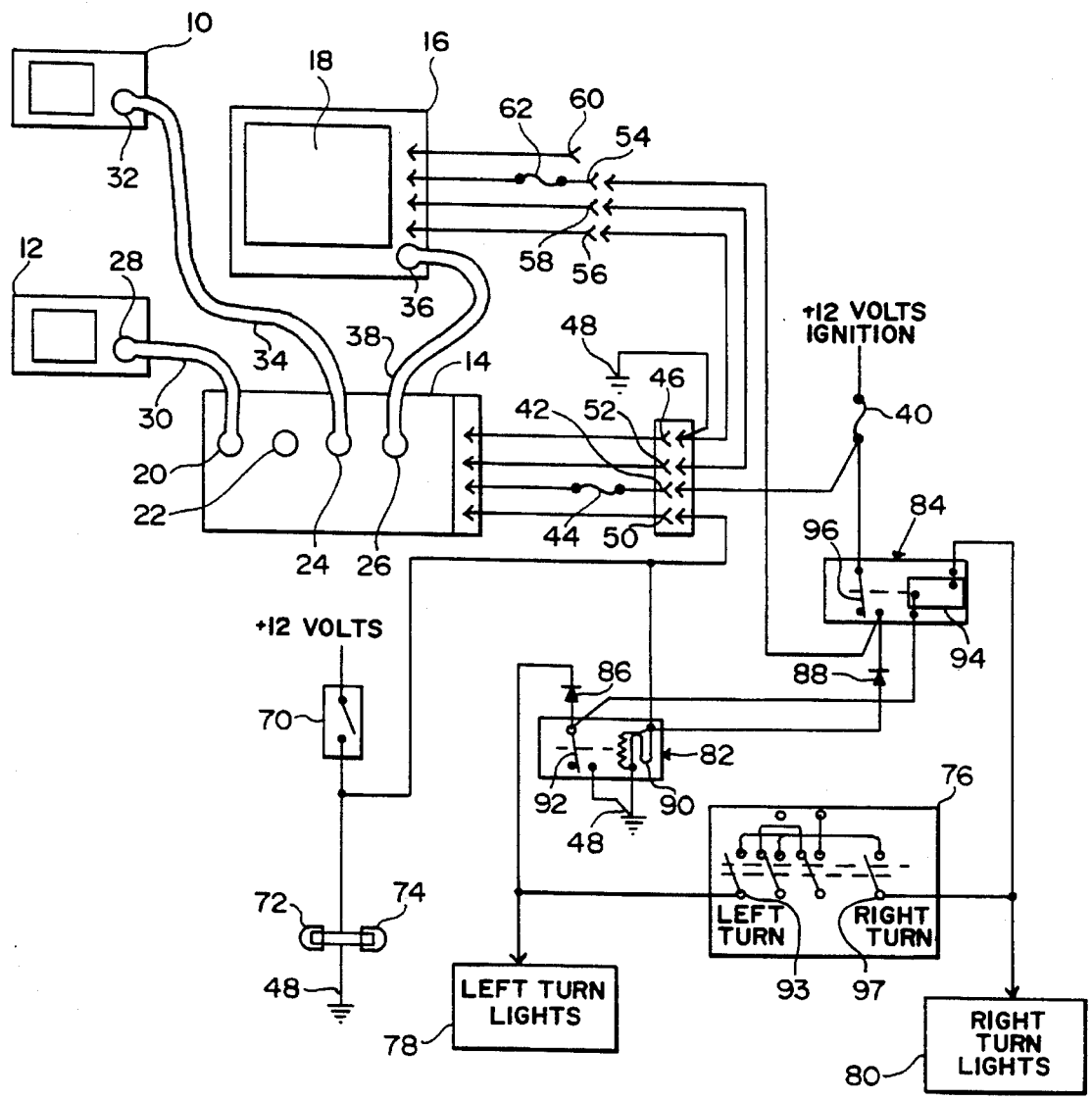
FIG. 1 is an electrical schematic diagram of a closed circuit television system of a tractor-trailer in accordance with principles of the invention.

A known, commercially available closed circuit television system for a tractor-trailer comprises plural video cameras, such as cameras 10 and 12, that are coupled with a video switch 14 that is in turn coupled with a video monitor 16. Camera 10 observes a field of view to the rear of the tractor-trailer while camera 12 observes a field of view to the side opposite the side where the driver's seat is located. Monitor 16 comprises a screen 18 that is disposed for convenient viewing by the driver when operating the vehicle from the driver's seat. Where the driver's seat is on the left side of the vehicle, camera 12 provides a view to the right side, and this will be the configuration for the exemplary installation in FIG. 1. The known commercially available 12 volt DC closed circuit television system for automotive vehicles referred to herein is known as the Camera & Monitor System [CCMS] available from Clarion Co. Ltd using Model No. CC-810 Cameras and a Model No. CJ-711F Car Rearview TV Monitor.

Switch 14 has plural video input ports 20, 22, and 24, and a video output port 26. Camera 12 comprises a video output port 28 that is connected to port 20 by means of a video cable 30. Camera 10 comprises a video output port 32 that is connected to port 24 by means of a video cable 34. Monitor 16 comprises a video input port 36 to which port 26 is connected by means of a video cable 38.

The television system is designed to utilize the existing electrical system of the vehicle for operating power and for sensing certain conditions of vehicle operation. Power is supplied from switch 14 to the cameras 12 and 10 through wiring (not shown) incorporated in the video cables 30 and 34 respectively while switch 14 and monitor 16 are connected to the vehicle power supply in the following manner. The vehicle power supply is nominally +12 VDC relative to ground, and the drawing shows +12 VDC from the usual ignition branch of the vehicle electrical system being coupled through a circuit protection device 40 (such as a fuse) to an input terminal 42 for switch 14. The drawing further shows an in-line fuse 44 of smaller current rating than device 40 between terminal 42 and the internal circuitry of switch 14. Another terminal 46 for switch 14 is connected to ground potential 48. There are also two additional terminals 50, 52 for switch 14, and they are associated with automated control of the switch and monitor when the vehicle is placed in reverse, as will become more apparent later on.

The drawing shows four terminals 54, 56, 58, 60 associated with monitor 16. The commercially available monitor has a fifth terminal (not shown) that is left disconnected for purposes of the present invention. Terminal 56 is connected to ground potential 48. Terminal 54 is the positive DC input terminal for receiving the positive DC potential of the vehicle power supply. Terminal 58 is connected directly to terminal 52 of switch 14. Terminal 60 is connected to the vehicle's instrument panel lighting. An in-line fuse 62 is in the positive feed at terminal 54 for a similar purpose with respect to the monitor as that of placing fuse 44 in the feed to switch 14.

The monitor, video switch, and cameras that have been described in connection with this Description of the Preferred Embodiment are existing components of the known, commercially available closed circuit television system described earlier. They are associated with the vehicle's existing back-up light signal system so that when the driver places the vehicle transmission in reverse gear, camera 10 is actively connected to monitor 16 so that the rear field of view captured by camera 10 is displayed on screen 18 to the exclusion of any other video camera input.

In addition to the back-up light system, the vehicle is equipped with certain other conventional systems, including a turn signal system and a hazard warning signal system. The feature of forcing the rear view onto the monitor screen when the vehicle is put in reverse is retained in the present invention, but certain additional automated functions will be performed automatically depending upon turn signaling and hazard warning signaling conditions.

FIG. 1 further shows the vehicle's existing back-up light switch 70, back-up lights 72, 74, an integrated turn signal and hazard warning switch 76, left turn signal lights 78, and right turn signal lights 80. It should be appreciated that certain practices in the automotive industry sometimes integrate multiple functions into a single assembly, and that is the case for the integrated turn signal and hazard warning switch 76 which incorporates both turn and hazard warning switch functions. Also, the illustrated turn signal lights 78, 80 are used to give both hazard warning and turn signals. Accordingly, it is to be understood that the accompanying illustration of the turn signal and hazard warning circuits discloses one specific configuration that is representative of a number of alternate, but equivalent, configurations.

The disclosed embodiment of the invention involves the addition of a standard relay 82, a time delay relay 84, and two diodes 86, 88, along with certain wiring accommodations for them. Relay 82 comprises a coil 90 that controls a set of contacts 92. When coil 90 is not energized, contacts 92 are open; when the coil is energized, the contacts are closed. Coil 90 is connected between the load side of switch 70 and ground 48. One side of contacts 92 is connected to ground 48 while the opposite side is connected to two branch circuits. One branch circuit contains diode 86 connecting that opposite side of contacts 92 to a terminal 93 of switch 76 to which the left turn signal lights 78 are connected; the other branch circuit is a connection to relay 84.

Relay 84 comprises a time delay coil 94 and a set of contacts 96. One side of contacts 96 is connected to the load side of device 40; the other side is connected to a first branch circuit leading directly to terminal 54 through the in-line fuse 62 and to a second branch circuit that contains diode 88 connecting that other side of contacts 96 to the load side of back-up light switch 70. One terminal of coil 94 connects to the ungrounded side of contacts 92 while the other terminal of coil 94 connects to a terminal 97 of switch 76 to which the right turn signal lights 80 are connected.

Operation will now be described for the following combinations of conditions, it being understood that the construction of switch 76 is such that it is impossible to simultaneously actuate both right and left turn signal switch portions of switch 76 and that actuation of the hazard warning switch portion of switch 76 will produce the same effect as if both right and left turn signal switch portions were simultaneously actuated:

1) Vehicle in reverse, turn signals off, hazard warning signal off;
2) Vehicle in reverse, right turn signal on, hazard warning signal off;
3) Vehicle in reverse, left turn signal on, hazard warning signal off;
4) Vehicle in reverse, hazard warning signal on;
5) Vehicle not in reverse, turn signals off, hazard warning signal off;
6) Vehicle not in reverse, right turn signal on, hazard warning signal off;
7) Vehicle not in reverse, left turn signal on, hazard warning signal off;
8) Vehicle not in reverse, hazard warning signal on.

Moreover, the following conditions are understood to exist: 1) the positive vehicle system voltage is applied through protection device 40 to both one side of contacts 96 of relay 84 and terminal 42 of video switch 14 when the usual vehicle ignition switch is turned on; 2) the monitor's on-off switch is on and its mode switch is in manual; and 3) the video switch's mode switch is in automatic, its port-enabling switches for ports 20 and 24 are on, and its port-enabling switch for the non-connected port 22 is off.

Vehicle In Reverse, Turn Signals Off, Hazard Warning Signal Off

Back-up light switch 70 closes when the vehicle transmission is placed in reverse gear, causing back-up lights 72, 74 to illuminate. The positive voltage that is conducted by switch 70 to these lights is also conducted to the ungrounded side of coil 90 of relay 82, to terminal 50 of video switch 14, and through diode 88 to terminal 54 of monitor 16. Relay 82 thereby operates contacts 92 from open to closed, grounding one side of coil 94 of relay 84. However, since neither turn nor hazard warning signals are being given, the opposite side of coil 94 is left floating, and hence coil 94 remains unenergized, maintaining contacts 96 open.

Because of the positive voltage input to terminal 42 whenever the ignition switch is on, video switch 14 is able to operate whenever the ignition switch is on. Power is however selectively applied to monitor terminal 54 so that screen 18 will be dark when no camera is being actively connected to monitor 16 by switch 14, and the purpose in doing this is to avoid an illuminated screen displaying only "snow" under those circumstances. The closing of switch 70 forces the closed circuit television system to display the field of view of rear camera 10 on monitor screen 18. This occurs because of the construction of switch 14, which upon sensing positive system voltage at terminal 50 causes the rear camera 10 to be actively connected to monitor 16.

Thus for this set of conditions, the closed circuit television depicted by FIG. 1 appears to the driver to operate no differently from the known system described earlier.

Vehicle In Reverse, Right Turn Signal On, Hazard Warning Signal Off

For descriptive purposes, assume that the system is in the state that results from the set of conditions just described under heading 1) where the back-up light switch is closed and the turn signal and hazard warning signals are off. Actuation of the right turn signal will now cause positive system voltage to be switched on and off to coil 94 of relay 84 at the rate at which the flasher (not shown) flashes the right turn signals. Because relay 84 is a time delay relay with a delay time longer than the off interval between turn signal flashes, contacts 96 remain continuously closed so long as the right turn signal continues to be given. However, the fact that the right turn signal is being given has no effect on the closed circuit television system, and consequently, the rear view from camera 10 continues to be displayed on the monitor screen. There is a minor effect in the circuit to the extent that positive system voltage is directly applied to terminal 54 through contacts 96 rather than through the small voltage drop due to the presence of diode 88.

Vehicle In Reverse, Left Turn Signal On, Hazard Warning Signal Off

For descriptive purposes, assume that the system is in the state that results from the set of conditions described above under heading 1) where the back-up light switch is closed and the turn signal and hazard warning signals are off. Actuation of the left turn signal will have no effect on operation of the closed circuit television system because diode 86 is poled to block any positive voltage at terminal 93 from contacts 92 while they are being grounded.

Vehicle In Reverse, Hazard Warning Signal On

For descriptive purposes, once again assume that the system is in the state that results from the set of conditions described above under heading 1) where the back-up light switch is closed and the turn signal and hazard warning signals are off. Actuation of the hazard warning switch is equivalent to simultaneously actuating both the left and right turn signals. It will have no effect on operation of the closed circuit television system because diode 86 is poled to block any positive voltage at terminal 93 from contacts 92 while they are being grounded, and even though relay 84 is operating contacts 96 closed, the only change is the slight increment in positive voltage being applied to terminal 54 due to by-passing of the feed containing diode 88.

Vehicle Not In Reverse, Turn Signals Off, Hazard Warning Signal Off

Neither relay is energized, and so the monitor screen is blank.

Vehicle Not In Reverse, Right Turn Signal On, Hazard Warning Signal Off

None of the connections to coil 90 of relay 82 provides a potential for energizing it, and so it remains unenergized. However, the impedance of the left turn lights 78 is sufficiently small in comparison to the impedance of coil 94 of relay 84 that the positive potential delivered to coil 94 from terminal 97 due to the actuation of the right turn signal switch causes a sufficiently large voltage to be applied across coil 94 to energize it. Accordingly, contacts 96 are operated to apply the vehicle electrical system's positive potential to terminal 54 of monitor 16. Because no voltage is being applied to terminal 50 of video switch 14 due to the fact that back-up light switch 70 is open and diode 88 is blocking the voltage delivered through the now closed contacts 96 of relay 84, the video signal that is actively conducted to monitor 16 is that from the right side camera 12. Hence, when the vehicle is being operated to make a forward right turn with the right turn signal being actuated, it is the view to the right side that is present on screen 18, enabling the driver to see to the right side of the tractor-trailer.

Vehicle Not In Reverse, Left Turn Signal On, Hazard Warning Signal Off

Here too, none of the connections to coil 90 of relay 82 provides a potential for energizing it, and so it remains unenergized. Since no positive voltage potential is present at terminal 97, coil 94 of relay 84 remains unenergized, and so screen 18 remains blank.

Vehicle Not In Reverse, Hazard Warning Signal On

Since the positive system potential of the vehicle's electrical system is being applied in unison to terminals 93 and 97, it is impossible for any potential difference to be developed across coil 94, and so it remains unenergized. Consequently, screen 18 is forced to remain blank since contacts 96 cannot be closed to deliver power to monitor 16 for energizing the screen.

Based on the foregoing description of possible combinations of operating conditions, it can be seen that the conditions specified by one fleet operator for displaying particular views on the monitor screen have been satisfied. Specifically, 1) rear video camera 10 will continue to be actively connected to monitor 16 to the exclusion of video camera 12 whenever the vehicle is placed in reverse gear regardless of whether or not a hazard warning or turn signal is being given, 2) video camera 12 will be actively connected to monitor 16 to the exclusion of video camera 10 when the right turn signal is being given to signal a forward right turn, provided that neither reverse gear nor the hazard warning signal is being selected at the same time as the right turn signal, and 3) video camera 12 will be prevented from being actively connected to monitor 16 whenever the hazard warning signal is being given.

While a presently preferred embodiment of the invention has been illustrated and described, it should be appreciated that principles are applicable to other embodiments that are equivalent to the following claims.

What is claimed is:

1. An automotive vehicle comprising operator controls including a turn signaling system for signaling a right turn by flashing a right lamp means and a left turn by flashing a left lamp means, a hazard warning system for signaling a hazard warning by flashing both said right lamp means and said left lamp means, a gear selector system for selecting a forward gear to cause a vehicle to move forward and a reverse gear to cause the vehicle to move in reverse, and a closed circuit television system comprising a video monitor comprising a screen in view of an operator and a video input port, a rear video camera for observing a field of view to the rear of the vehicle, a side video camera for observing a field of view to one of the right side and the left side of the vehicle, a video switch for selectively connecting said video cameras with said video monitor comprising a first video input port connected with said rear video camera, a second video input port connected with said side video camera, and an output video port connected with said video input port of said monitor, said monitor comprising an on-off switch for selectively connecting and disconnecting the monitor to and from a source of electric power for operating the monitor screen and a mode switch for selecting between a manual mode of operation and an automatic mode of operation, said video switch comprising its own mode switch for selecting between a manual mode of operation and an automatic mode of operation and an input port-enabling switch associated with said second video input port of said video switch for selectively enabling said second video input port of said video switch, characterized by an automation circuit operatively coupling said turn signaling system, said hazard warning system, and said gear selector system with said video switch and said video monitor and comprising means effective when said mode switch of said monitor is in manual mode, said mode switch of said video switch is in automatic mode, said on-off switch of said monitor is on, and said input port-enabling switch of said video switch that is associated with said second video input port of said video switch is enabling said second video input port, for causing said rear video camera to be actively connected to said monitor screen to the exclusion of said side video camera whenever said gear selector system is selecting reverse gear regardless of whether said turn signal system is signaling a turn or said hazard warning system is giving a hazard warning, for causing said side video camera to be actively connected to said monitor screen whenever said turn signal system is signaling a turn to the same side of the vehicle as the side viewed by said side video camera provided that reverse gear is not being selected by said gear selector system, and for preventing said side video camera from being actively connected to said monitor screen whenever said hazard warning system is signaling a hazard warning.

2. An automotive vehicle as set forth in claim 1 in which said automation circuit comprises a time delay relay that is energized by the actuation of said turn signal system to indicate a turn to the same side of the vehicle as the side viewed by said side video camera provided that reverse gear is not being selected by said gear selector system, such energization of said time delay relay providing the application of power to said monitor through said monitor's on-off switch, said video switch being responsive to the concurrence of said gear selector system not selecting reverse gear and said time delay relay being energized to cause the view of said side video camera to be displayed on said monitor screen.

3. An automotive vehicle as set forth in claim 2 in which said automation circuit comprises means, effective when said hazard warning system is actuated to give a hazard warning signal, to prevent said time delay relay from being energized and consequently prevent said side video camera from being actively connected to said monitor screen.

4. An automotive vehicle comprising operator controls including a turn signaling system for signaling a right turn by flashing a right lamp means and a left turn by flashing a left lamp means, a hazard warning system for signaling a hazard warning by flashing both said right lamp means and said left lamp means, a gear selector system for selecting a forward gear to cause a vehicle to move forward and a reverse gear to cause the vehicle to move in reverse, and a closed circuit television system comprising a video monitor comprising a screen in view of an operator and a video input port, a rear video camera for observing a field of view to the rear of the vehicle, a side video camera for observing a field of view to one of the right side and the left side of the vehicle, a video switch for selectively connecting said video cameras with said video monitor comprising a first video input port connected with said rear video camera, a second video input port connected with said side video camera, and an output video port connected with said video input port of said monitor, characterized by an automation circuit operatively coupling said turn signaling system, said hazard warning system, and said gear selector system with said video switch and said video monitor and comprising means effective for causing said rear video camera to be actively connected to said monitor screen to the exclusion of said side video camera whenever said gear selector system is selecting reverse gear regardless of whether said turn signal system is signaling a turn or said hazard warning system is giving a hazard warning, for causing said side video camera to be actively connected to said monitor screen whenever said turn signal system is signaling a turn to the same side of the vehicle as the side viewed by said side video camera provided that reverse gear is not being selected by said gear selector system, and for preventing said side video camera from being actively connected to said monitor screen whenever said hazard warning system is signaling a hazard warning.

5. An automotive vehicle comprising operator controls including a turn signaling system for signaling a right turn by flashing a right lamp means and a left turn by flashing a left lamp means, a hazard warning system for signaling a hazard warning by flashing both said right lamp means and said left lamp means, a gear selector system for selecting a forward gear to cause a vehicle to move forward and a reverse gear to cause the vehicle to move in reverse, and a closed circuit television system comprising a video monitor comprising a screen in view of an operator and a video input port, a rear video camera for observing a field of view to the rear of the vehicle, a side video camera for observing a field of view to one of the right side and the left side of the vehicle, a video switch for selectively connecting said video cameras with said video monitor comprising a first video input port connected with said rear video camera, a second video input port connected with said side video camera, and an output video port connected with said video input port of said monitor, characterized by an automation circuit operatively coupling said turn signaling system, said hazard warning system, and said gear selector system with said video switch and said video monitor and comprising means effective for causing said rear video camera to be actively connected to said monitor screen to the exclusion of said side video camera whenever said gear selector system is selecting reverse gear regardless of whether said turn signal system is signaling a turn or said hazard warning system is giving a hazard warning, and a time delay relay that is energized to cause said side video camera to be actively connected to said monitor screen whenever said turn signal system is signaling a turn to the same side of the vehicle as the side viewed by said side video camera provided that reverse gear is not being selected by said gear selector system, and that is prevented from being energized whenever said hazard warning system is being operated to give a hazard warning signal to thereby prevent said side camera from being actively connected to said monitor screen whenever said hazard warning system is signaling a hazard warning.

* * * * *